(12) United States Patent
Perakes et al.

(10) Patent No.: US 9,016,150 B2
(45) Date of Patent: Apr. 28, 2015

(54) TRANSMISSION HAVING SELECTABLE POWER TRANSFER SHAFT

(71) Applicant: Ford Global Technologies, LLC, Dearborn, MI (US)

(72) Inventors: Andreas E. Perakes, Canton, MI (US); Matthew David Hammond, Dearborn, MI (US); Laurence Andrew Deutsch, Farmington Hills, MI (US); Steven Anatole Frait, Milan, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/326,577

(22) Filed: Jul. 9, 2014

(65) Prior Publication Data

US 2015/0027245 A1 Jan. 29, 2015

Related U.S. Application Data

(60) Provisional application No. 61/859,402, filed on Jul. 29, 2013.

(51) Int. Cl.
*B60K 25/06* (2006.01)
*B60K 17/34* (2006.01)
*B60K 23/08* (2006.01)

(52) U.S. Cl.
CPC ............. *B60K 25/06* (2013.01); *B60K 17/34* (2013.01); *B60K 23/08* (2013.01)

(58) Field of Classification Search
CPC .. B60K 25/06; B60K 17/28; B60K 2025/065; B60K 17/34; B60K 17/356; B60K 23/08

USPC .......... 180/247, 248, 242, 243; 475/198, 159, 475/221, 206, 231; 74/15.82
See application file for complete search history.

(56) References Cited

U.S. PATENT DOCUMENTS

| | | | | |
|---|---|---|---|---|
| 2,865,227 | A * | 12/1958 | Kelley | 477/53 |
| 6,848,555 | B2 * | 2/2005 | Sakata et al. | 192/70.12 |
| 7,178,654 | B2 * | 2/2007 | Ronk et al. | 192/85.63 |
| 7,309,301 | B2 * | 12/2007 | Janson et al. | 475/200 |
| 7,419,041 | B2 * | 9/2008 | Diemer et al. | 192/69.7 |
| 8,042,642 | B2 * | 10/2011 | Marsh et al. | 180/247 |
| 8,256,328 | B2 * | 9/2012 | Stephens et al. | 74/665 F |
| 2010/0084210 | A1 * | 4/2010 | Martus et al. | 180/245 |
| 2011/0166752 | A1 * | 7/2011 | Dix et al. | 701/50 |
| 2011/0275470 | A1 * | 11/2011 | Ekonen et al. | 475/198 |
| 2013/0303326 | A1 * | 11/2013 | Downs et al. | 475/221 |
| 2014/0021005 | A1 * | 1/2014 | Greiss et al. | 192/112 |
| 2014/0051541 | A1 * | 2/2014 | Osborn et al. | 475/209 |
| 2014/0342869 | A1 * | 11/2014 | Maurer et al. | 475/198 |
| 2014/0357445 | A1 * | 12/2014 | Brooks | 475/225 |

* cited by examiner

*Primary Examiner* — Paul N Dickson
*Assistant Examiner* — Darlene P Condra
(74) *Attorney, Agent, or Firm* — James Dottavio; Brooks Kushman P.C.

(57) ABSTRACT

A vehicle powertrain includes a transaxle configured to drive front wheels and a power take-off unit configured to drive rear wheels through a driveshaft. The power take-off unit includes a disconnect clutch such that the power flow path to the rear wheels can be disconnected to reduce fuel consumption and reconnected when needed for traction enhancement. Although the disconnect clutch is physically located within the power take-off unit, it is actuated by fluid from the transaxle valve body. The disconnect clutch actuator includes a piston that slides within a chamber in a housing and a solenoid controlled valve that fluidly connects the chamber either to a pressure source or to the transaxle sump.

16 Claims, 5 Drawing Sheets

TRANSMISSION HAVING SELECTABLE POWER TRANSFER SHAFT

CROSS-REFERENCE TO RELATED APPLICATIONS

This application claims the benefit of U.S. provisional application Ser. No. 61/859,402 filed Jul. 29, 2013, the disclosure of which is hereby incorporated in its entirety by reference herein.

TECHNICAL FIELD

This disclosure relates to the field of automotive transmissions. More particularly, the disclosure pertains to a front wheel drive transmission with a power transfer shaft configured to selectively transfer power to rear wheels.

BACKGROUND

Two vehicle powertrain configurations predominate the modern passenger vehicle market, rear wheel drive (RWD) and front wheel drive (FWD). With additional hardware, both of these configurations can be configured to direct power to all four wheels. Because traction at any particular wheel may be limited at certain times, the ability to direct power to all four vehicle improves mobility. However, the additional hardware introduces additional parasitic losses which increase fuel consumption even in conditions that do not require the additional capability.

In a typical RWD configuration, the engine is oriented longitudinally in the vehicle such that the crankshaft axis is aligned with the direction of vehicle movement. A transmission mounted to the engine drives a rear driveshaft at a speed which may be less than or greater than the speed of the engine crankshaft according to current vehicle requirements. The rear driveshaft is connected to a rear axle that changes the axis of rotation, reduces the rotational speed, and drives left and right rear axles while permitting slight speed differences between the axles as the vehicle turns a corner. A RWD configuration is adapted to also drive the front wheels by adding a transfer case between the transmission and the rear driveshaft. In addition to driving the rear driveshaft, the transfer case drives a front driveshaft that, in turn, drives a front axle. Some transfer cases include a planetary gear set that divides the torque between front and rear driveshafts while allowing slight speed differences. Other transfer cases have an actively controlled torque on demand (TOD) clutch that only drives the front driveshaft in certain conditions, such as when a controller senses loss of traction of the rear wheels.

In a typical FWD configuration, the engine is oriented transversely in the vehicle such that the crankshaft axis is aligned with the axis of wheel rotation. A transmission mounted to the engine drives a front differential at a speed suitable for current vehicle requirements. The front differential is typically integrated into a common housing with the transmission gearbox. The front differential drives left and right front axles while permitting slight speed differences between the axles as the vehicle turns a corner. A FWD configuration is adapted to also drive the rear wheels by adding a power take off unit (PTU) that drives a rear driveshaft at a speed proportional to the speed of the front differential. A rear drive unit (RDU) typically includes a TOD clutch that, when engaged drives a rear differential that, in turn, drives left and right rear axles.

SUMMARY

A vehicle includes a transmission, a power take-off unit (PTU), and an auxiliary actuator. The transmission and the PTU each have housings which contain separate fluids. The PTU includes a disconnect clutch, actuated by the auxiliary actuator, to selectively establish or release a power flow path between the transmission output and a driveshaft. The transmission includes a valve body that, in addition to distributing transmission fluid to shift elements within the transmission, also distributes fluid to the auxiliary actuator. The actuator may include a piston configured to slide within a chamber, a tube from the transmission valve body, and a solenoid controlled valve that alternately connects the chamber to the tube of the transmission sump.

A transaxle includes a gearbox within a housing, an auxiliary actuator, and a valve body. The auxiliary actuator moves a sleeve that is supported outside the housing in response to fluid pressure supplied by the valve body. The transaxle may also include a differential that distributes power to a first axle and a second axle. The sleeve may move parallel to the axis of the axle shafts. The actuator may include a piston configured to slide within a chamber, a tube from the transmission valve body, and a solenoid controlled valve that alternately connects the chamber to the tube of the transmission sump. The tube may run either inside the transmission housing or it may be external to the transmission housing.

A transmission auxiliary actuator includes an actuator housing, a piston configured to slide within the housing, and a solenoid controlled valve that alternately connects a chamber within the housing to either a source of pressurized fluid or to a transmission sump. The source of pressurized fluid may be a transmission valve body. The actuator housing is adapted for fixation to an exterior surface of a transmission housing. The piston is adapted to actuate a clutch outside the transmission housing. The clutch may be a disconnect clutch within a power take-off unit fixed to the transmission housing.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
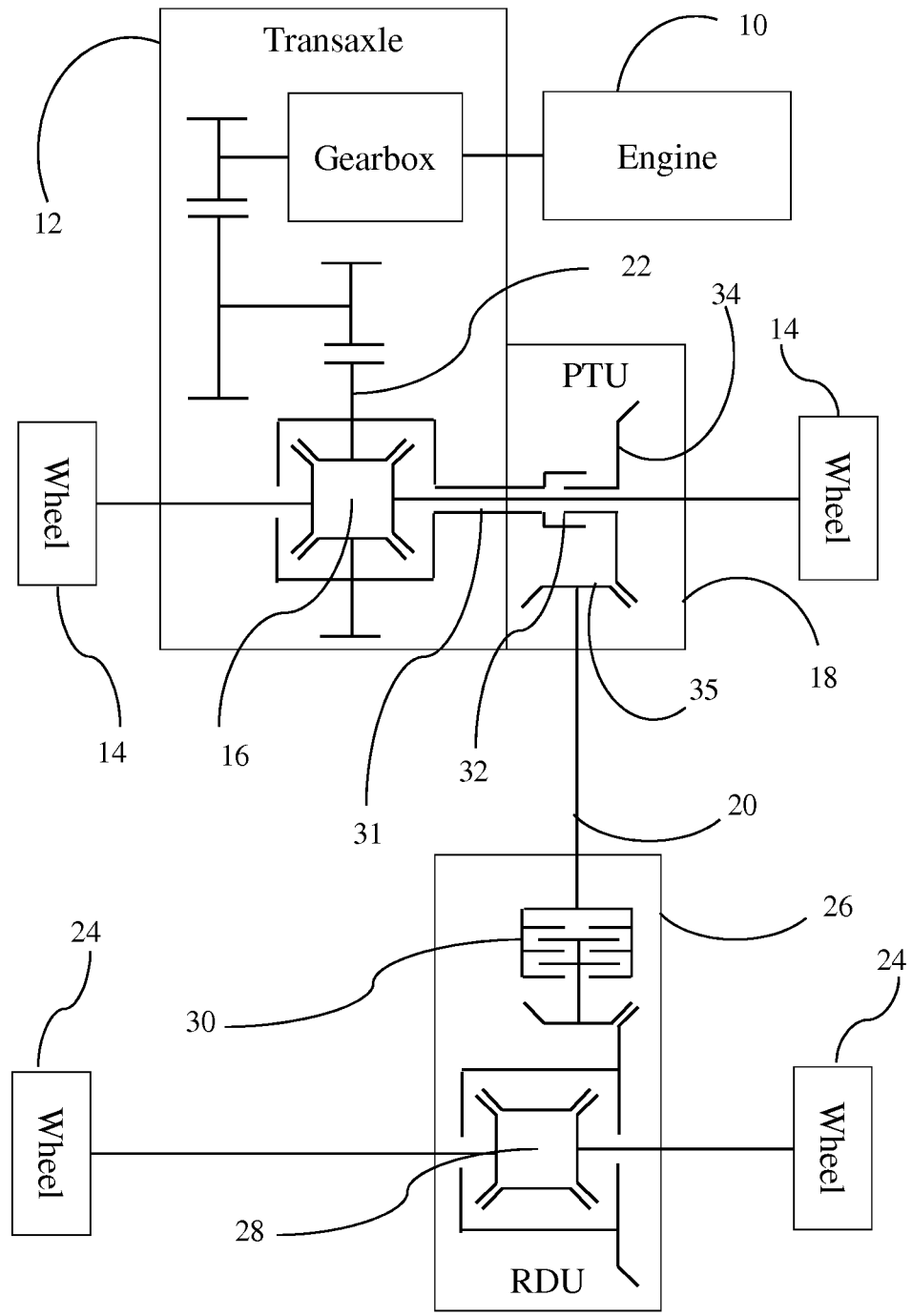
FIG. 1 is a schematic representation of a vehicle powertrain.

FIG. 1 schematically illustrates a FWD-based AWD vehicle. A transversely mounted engine 10 and transaxle 12 drive front wheels 14 via a front differential 16. The front differential transmits approximately equal torque from transmission output 22 to each front wheel while allowing slight speed differences when the vehicle turns a corner. Specifically, output 22 rotates at a median speed between speeds of the left and right axle shafts. In order to also drive the rear wheels, a power transfer unit (PTU) 18 is mounted to the transaxle to drive a longitudinal driveshaft 20. PTU input shaft 31 is coupled to transmission output shaft 22. When disconnect clutch 32 is engaged, bevel gear 34 is driveably connected to PTU input shaft 31. Bevel gear 34 meshes with bevel gear 35 to change the axis of rotation approximately 90 degrees. The driveshaft then drives the rear wheels 24 through a rear drive unit (RDU) 26 having a rear differential 28. The RDU includes an actively controlled clutch 30 that selectively couples the driveshaft to the rear differential when loss of traction on the front wheels is detected or anticipated and decouples them in other conditions.

Although the AWD system only transmits power to the rear wheels when the RDU clutch is engaged, a number of components, including the driveshaft, rotate at a speed proportional to vehicle speed whenever disconnect clutch 32 is engaged. Rotation of these components results in parasitic drag that increases the load on the engine and increases fuel consumption. The impact of the parasitic losses tends to be more severe at higher vehicle speeds. The adverse impact of this parasitic drag can be reduced if some of the components are disconnected during periods when traction enhancement is not needed. Disengaging disconnect clutch 32 permits these components to stop rotating which reduces fuel consumption.

Figure 2:
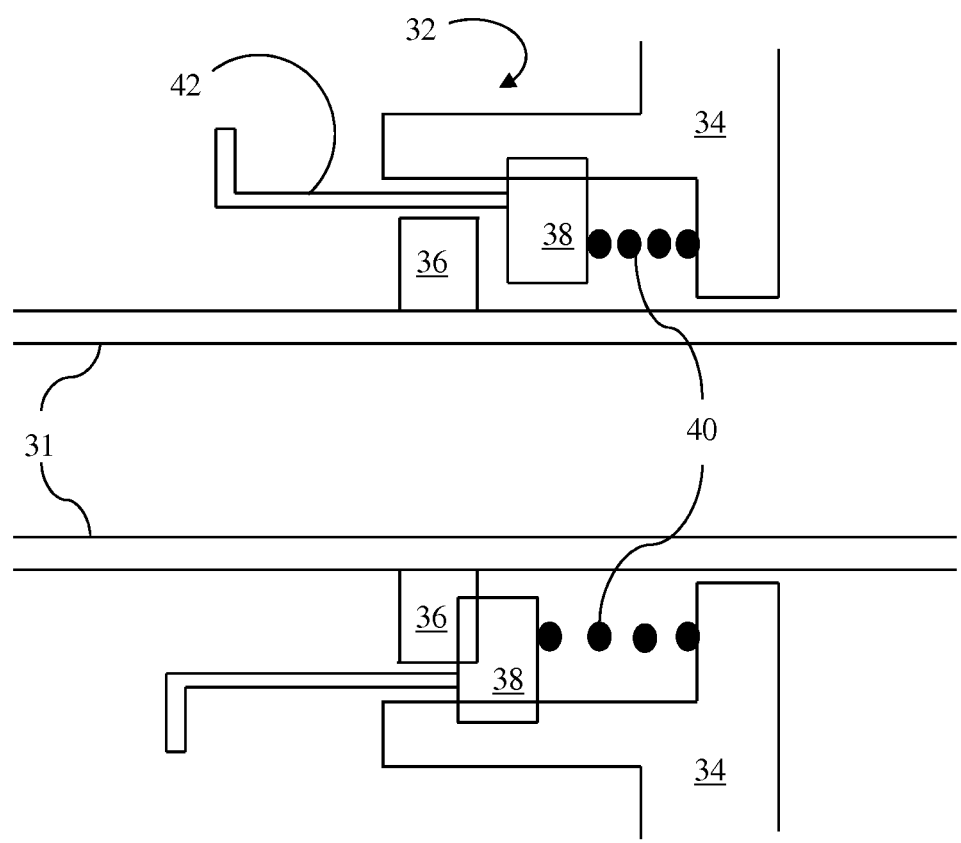
FIG. 2 is a cross sectional view of a PTU disconnect clutch.

Disconnect clutch 32 is shown in more detail in FIG. 2. Although the disconnect clutch is axisymmetric, for convenience the top half of the figure shows the clutch in the disengaged position while the bottom half shows the clutch in the engaged position. A first set of dog teeth 36 is fixed to PTU input shaft 31. A second set of dog teeth 38 is splined to rotate with bevel gear 34 but permitted to slide axially. Engagement spring 40 pushes dog teeth 38 axially into engagement with dog teeth 36 to couple PTU input shaft 31 to bevel gear 34, as shown on the bottom of FIG. 2. Sleeve 42 slides axially with respect to RDU bevel gear 34. When sleeve 42 slides to the right as shown on the top of FIG. 2, it pushes dog teeth 38 out of engagement with dog teeth 36, decoupling PTU input 31 from bevel gear 34.

Figure 3:
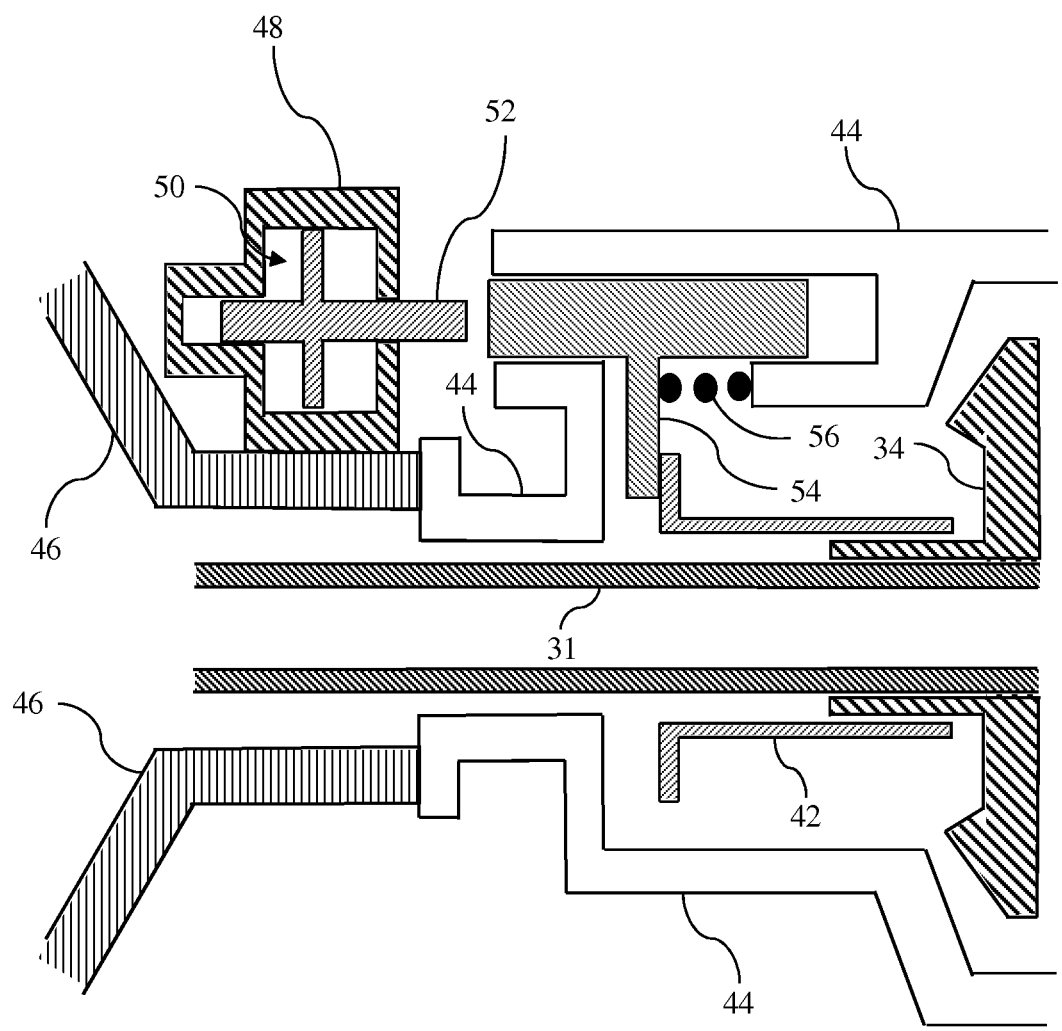
FIG. 3 is a cross sectional view of a first portion of a hydraulic actuation mechanism suitable for use with the PTU disconnect clutch of FIG. 2.

FIG. 3 illustrates the actuation mechanism for disconnect clutch 32. Disconnect clutch 32 is contained within PTU housing 44, which is fixed to transaxle housing 46 during vehicle assembly. Piston housing 48 is fixed to the exterior of transaxle housing 46. When pressurized fluid is routed into chamber 50, disconnect piston 52 is forced to the right. Disconnect fork 54 is supported by PTU housing 44 to slide axially with respect to transaxle 12 and PTU 18. As disconnect piston 52 moves to the right, it forces disconnect actuation fork 54 to slide to the right. Disconnect fork 54, in turn, pushes sleeve 42 to the right disengaging clutch 32. Although sleeve 42 rotates with bevel gear 34 and disconnect fork 54 does not rotate, any combination of relative speed and force are of short duration. Once the dog clutch is disengaged, drag on the driveshaft causes the bevel gear to stop rotating. When the fluid pressure in cavity 50 is relieved, return spring 56 pushes disconnect piston 52 and disconnect fork 54 to the left. Engagement spring 40 pushes sleeve 42 to the left. In an alternative embodiment, spring 52 is eliminated and engagement spring 40 pushes sleeve 42, disengagement fork 54, and disconnect piston 52 to the left. In another alternative embodiment, a spring between the transmission case 46 and disconnect piston 50 pushes disconnect piston 54 to the left. RDU clutch 30 may be used to synchronize the speeds of PTU input 31 and bevel gear 34 before attempting engagement.

Figure 4:
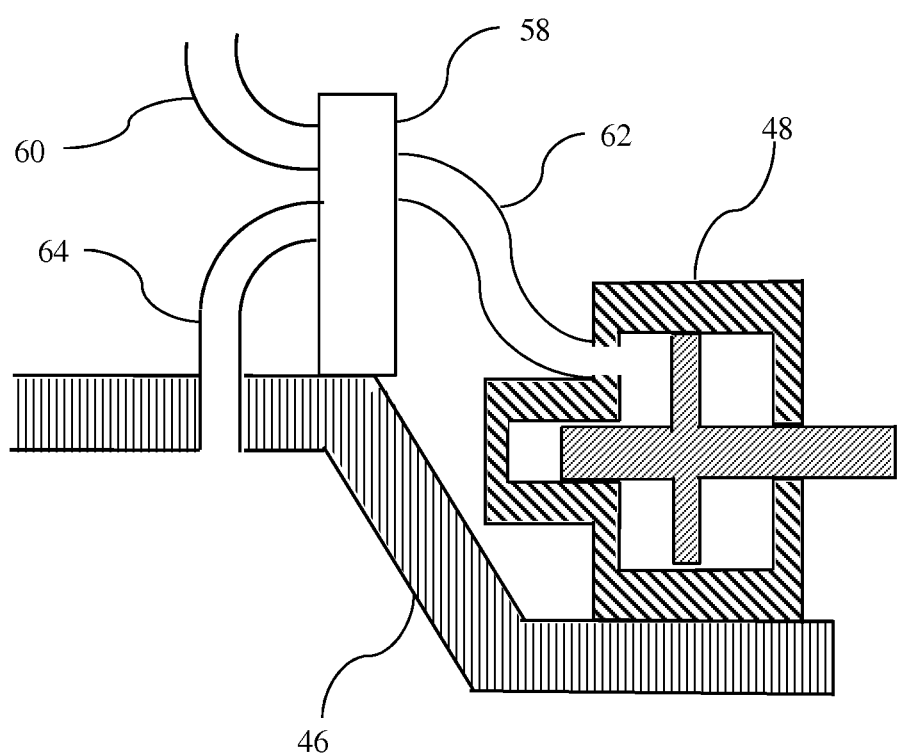
FIG. 4 is a cross sectional view of a second portion of the hydraulic actuation mechanism of FIG. 3.

Many automatic transaxles utilize pressurized fluid to engage various clutches and brakes to establish the various gear ratios. Therefore, such a transaxle already has a source of pressurized fluid. Integrating the actuator of the disconnect clutch with the transaxle eliminates the necessity to provide an independent source of fluid pressure. As shown in FIG. 4, solenoid 58, which is mounted to the exterior of transaxle case 46, regulates the pressure to cavity 50. Tube 60 conveys pressurized fluid from the transaxle valve body to solenoid 58. When electrical current is supplied to solenoid 58, tube 60 is fluidly connected to cavity 50 via tube 62. When electrical current is not supplied to solenoid 58, cavity 46 is fluidly connected to an exhaust tube 64 allowing fluid to drain into the interior of transaxle case 46. Alternatively, the solenoid may be configured to connect cavity 50 to exhaust tube 64 when current is supplied and to pressure supply tube 60 when no current is supplied.

Figure 5:
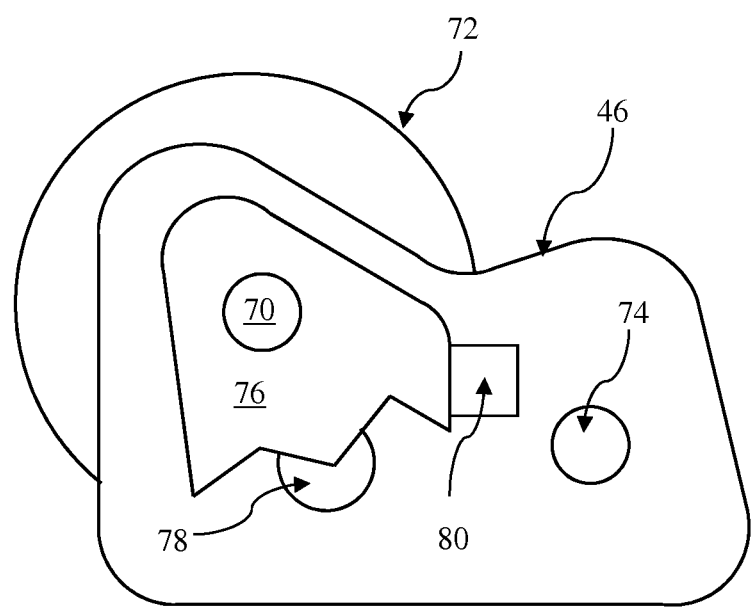
FIG. 5 is a cut-away end view of a transmission case and pump body assembly adapted for use in conjunction with the hydraulic actuator mechanism.

In an alternative embodiment, fluid may be routed to solenoid 58 through an interior passageway. FIG. 5 shows an end cutaway view of transmission case 46. Gearbox input shaft 70 passes through the case from the converter housing 72. PTU input 31 and the passenger side half shaft pass through transmission case 12 at 74. A pump housing 76 may be bolted to the inside of the transmission case. Pump 78, which is enclosed in pump housing 76, provides pressurized fluid to the transmission valve body which may be partially or completely integrated with the pump housing. An extension 80 of the pump housing is opposite solenoid 58. Pressurized fluid may be routed from pump 78, through extension 80, then through a drilled hole in transmission case 46 to solenoid 58.

The mechanical interface between the transaxle and the PTU as described above provides advantages for manufacturing, testing, and assembly. The fluid used by the transaxle for actuation and lubrication is independent of the fluid used for lubrication within the PTU. The transaxle and PTU may be manufactured and tested separately and bolted together just before installation into the vehicle.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a transmission configured to transmit power from an engine to an output shaft, the transmission having a transmission housing configured to contain a first fluid, the transmission having a valve body configured to adjust a ratio of a speed of the engine to a speed of the output shaft by distributing the first fluid at varying pressures to control elements;
   a power take-off unit (PTU) mounted to the transmission, the PTU having a PTU housing configured to contain a second fluid, the PTU having a disconnect clutch configured to selectively establish a speed ratio between the output shaft and a driveshaft; and
   an auxiliary actuator configured to actuate the disconnect clutch using the first fluid.

2. The vehicle of claim 1 wherein the transmission further comprises a differential configured to constrain the output shaft to rotate at a median speed between speeds of a first axle shaft and a second axle shaft.

3. The vehicle of claim 2 wherein the first axle shaft, second axle shaft, and output shaft are substantially coaxial.

4. The vehicle of claim 1 wherein the actuator comprises:
   a piston configured to slide within a chamber;
   a tube configured to transmit pressurized fluid from the valve body; and
   a solenoid controlled valve configured to alternately fluidly connect the chamber to either the tube or to an interior of the transmission housing.

5. A transaxle comprising:
   a gearbox configured to transmit power from an input to an output at a speed ratio;
   a housing configured to support the gearbox and to contain a volume of fluid;
   an auxiliary actuator adapted to move a sleeve supported outside of the housing; and
   a valve body configured to distribute the fluid to gearbox control elements to vary the speed ratio and to distribute the fluid to the auxiliary actuator.

6. The transaxle of claim 5 further comprising a differential supported by the housing and configured to constrain the output to rotate at a median speed between speeds of a first axle shaft and a second axle shaft, the first and second axle shafts and the output supported for rotation about an axle axis.

7. The transaxle of claim 6 wherein the sleeve is configured to move parallel to the axle axis.

8. The transaxle of claim 5 wherein the actuator comprises:
   a piston configured to slide with respect to the housing in response to a pressure of the fluid within a chamber.

9. The transaxle of claim 8 further comprising:
   a tube configured to transmit the fluid from the valve body; and
   a solenoid controlled valve configured to alternately fluidly connect the chamber to either the tube or to an interior of the housing.

10. The transaxle of claim 9 wherein the tube is external to the housing.

11. The transaxle of claim 9 wherein the tube is inside the housing.

12. A transmission auxiliary actuator comprising:
   an actuator housing adapted for fixation to an exterior surface of a transmission housing;
   a piston configured to slide within the actuator housing, the piston and actuator housing defining a chamber, the piston adapted to actuate a clutch outside the transmission housing; and
   a solenoid controlled valve configured to alternately fluidly connect the chamber to either a pressure source or to an interior of the transmission housing.

13. The transmission auxiliary actuator of claim 12 wherein the pressure source comprises a tube configured to transmit pressurized fluid from a transmission valve body.

14. The transmission auxiliary actuator of claim 13 wherein the tube is external to the transmission housing.

15. The transmission auxiliary actuator of claim 13 wherein the tube is internal to the transmission housing.

16. The transmission auxiliary actuator of claim 13 wherein the piston is adapted to actuate the clutch by pushing a sleeve which is supported in a power take-off unit and the power take-off unit is adapted for fixation to the transmission.

* * * * *